United States Patent [19]

Tateoka et al.

[11] 4,095,509
[45] Jun. 20, 1978

[54] VACUUM DEGREE AUGMENTATION DEVICE

[75] Inventors: Kiyoshi Tateoka, Fujisawa; Tomizo Azuma, Yamato, both of Japan

[73] Assignee: Tokico Ltd., Kawasaki, Japan

[21] Appl. No.: 741,676

[22] Filed: Nov. 15, 1976

[30] Foreign Application Priority Data

Nov. 20, 1975 Japan ............................... 50-157714

[51] Int. Cl.² ................................................ F15B 9/10
[52] U.S. Cl. .................................. 91/369 B; 92/98 R
[58] Field of Search .............. 91/369 B, 369 A, 369 R

[56] References Cited

U.S. PATENT DOCUMENTS

| 2,900,962 | 8/1959 | Ingres | 91/369 B |
|---|---|---|---|
| 2,989,033 | 6/1961 | Stelzer | 91/369 B |
| 3,183,789 | 5/1965 | Stelzer | 91/369 B |

FOREIGN PATENT DOCUMENTS 2,136,252  1/1973  Germany ........................... 91/369 B

*Primary Examiner*—Paul E. Maslousky
*Attorney, Agent, or Firm*—Schmidt, Johnson, Hovey & Williams

[57] ABSTRACT

A vacuum degree augmentation device for use in brake apparatus is provided in which a diaphragm-piston divides the body of a valve mechanism into two air-tight chambers, the valve mechanism is shiftable in response to the operation of a plunger which in turn operates in response to the operation of an input rod, the operation of the valve normally maintains the chambers in communication with each other under low pressure, but, during braking, one chamber is placed in communication with the open air to produce a differential pressure between the chambers so as to operate the piston, with the force operating the piston being transferred through a reaction lever, a fulcrum plate and an output rod to a master cylinder.

2 Claims, 5 Drawing Figures

4,095,509

VACUUM DEGREE AUGMENTATION DEVICE

BACKGROUND OF THE INVENTION

This invention relates to a fluid pressure-operated servo-motor and more particularly, to a reaction device of a vacuum degree augmentation device which is suitably employed as the power source for the operation of the master cylinder of a vehicular fluid pressure-operated brake device.

A great variety of vacuum degree augmentation devices have been proposed and practically employed and one of the prior art vacuum degree augmentation devices has a valve mechanism the body of which is divided into two air-tight chambers by a diaphragm-piston and which is shifted by the operation of a plunger which operates in response to the operation of an input rod. When the valve mechanism operates, the two chambers are normally in communication with each other under low pressure and in braking, one of the chambers is communicated with the atmosphere to produce a differential pressure between the two chambers which in turn operates the piston and the force urging the piston to operate is transferred through a reaction lever, a fulcrum plate and an output rod to a master cylinder.

However, in such a prior art vacuum degree augmentation device, since the reaction lever comprises a plain member, when the center portion of the reaction lever is urged forwardly (or is tilted toward the front side of the device), the reaction lever makes a point contact with the periphery of the cup-shaped fulcrum plate only at the opposite ends of the lever, and accordingly, the opposite ends of the reaction lever where the lever makes contact with the fulcrum plate are subjected to compressive stress to leave traces and/or wear at the ends. Thus, the prior art vacuum augmentation device has the disadvantage that after such point contact has been repeated for a long time period, the vacuum augmentation ratio of augmentation device varies and hysteresis will increase.

SUMMARY OF THE INVENTION

Therefore, the present invention is to provide a vacuum degree augmentation device which can effectively eliminate the disadvantages inherent in the prior art vacuum degree augmentation device.

According to the present invention, the reaction lever comprises a member which is curved outwardly in the center portion on at least one major surface of the member and the point of contact of the reaction lever with respect to the fulcrum plate is positioned in the center portion rather than at the opposite ends of the prior art reaction lever whereby possible compressive stress traces and/or wear on portions of the reaction lever where the lever makes contact with the fulcrum plate can be minimized to thereby reduce variation in augmentation ratio incident to the removal of the fulcrum for the reaction lever. Thus, the present invention provides a reaction lever which is durable and has a long service life.

The above and other objects and attendant advantages of the present invention will be more readily apparent to those skilled in the art from a reading of the following detailed description in conjunction with the accompanying drawings which show one preferred embodiment of the present invention for illustration purpose only, but not for limiting the scope of the same in any way.

PREFERRED EMBODIMENT OF THE INVENTION

Figure 1:
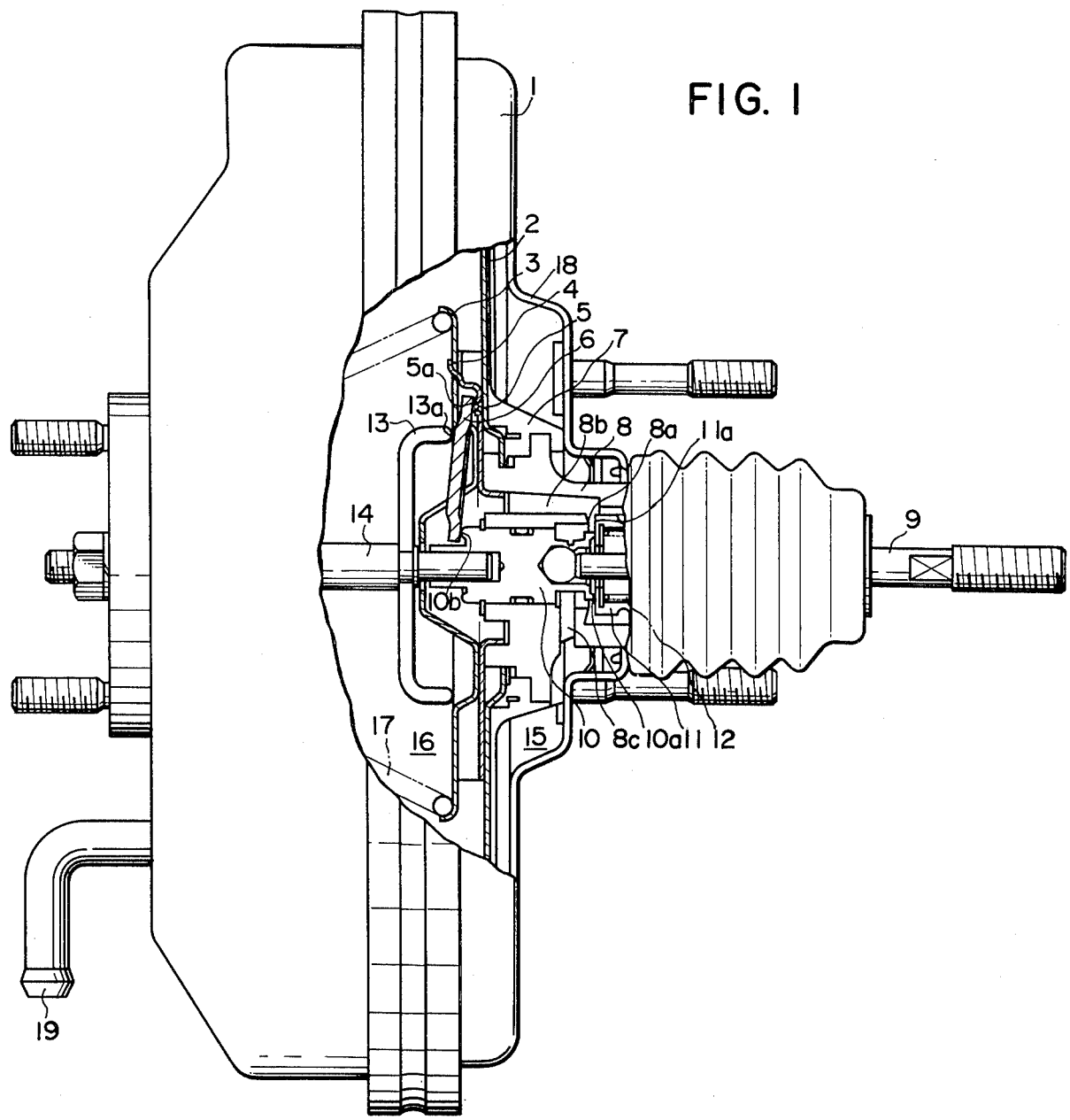
FIG. 1 is an elevational view of one preferred embodiment of vacuum degree augmentation device constructed in accordance with the present invention with a portion thereof shown in section.

The present invention will now be described referring to the accompanying drawings and more particularly, to FIG. 1 thereof in which one preferred embodiment of vacuum degree augmentation device of the invention is shown. The operation principle of the vacuum degree augmentation device is substantially similar to the prior art vacuum degree augmentation devices. That is, when the driver pushes the brake pedal down, a leftward thrust is produced in the input rod 9 in response to the pushing-down action. The leftward thrust produced in the input rod 9 leftwardly moves the plunger 10 caulked to the leading end of the input rod 9. Substantially at the same time, the poppet valve 11 which is normally urged leftwards by means of a spring 12 moves leftwards. The poppet valve 11 seats on the valve seat 10a on the plunger 10 and also on the valve seat 8a on the valve body 8 to isolate between the front chamber 16 in which a low pressure or negative pressure is normally maintained, the rear chamber 15 which is normally in communication with the front chamber 16 through passages 8b, 8c and the atmosphere, respectively. As the input rod 9 moves further leftwards, the valve seat 10a on the plunger 10 separates from the seating face 11a of the poppet valve 11 which now seats on the valve seat 10a whereby open air flows through the clearance between the valve seat 10a and the adjacent seating face 11a on the poppet valve 11 into the rear chamber 15 to produce a difference between the pressures within the chambers 15 and 16 on the opposite sides of the diaphragm 7 to thereby initiate a vacuum degree augmentation operation.

The augmented force caused by the differential pressure is transferred through the piston 2, plate 4 and pin 5 to the reaction lever 6 which has pivoted leftwards about the pin 5 up to now with the leading end of the lever abutting against the shoulder 10b on the plunger 10 as the result of the leftward movement of the plunger 10 following the movement of the input rod 9 as mentioned hereinabove and is then transferred to the fulcrum plate 13 and output rod 14 in the order.

When the brake pedal is released, the seating face 11a of the poppet valve 11 seats on the valve seat 10a on the plunger 10 as shown in FIG. 1, but separates from the valve seat 8a on the valve body 8. Thus, the negative pressure produced in the engine manifold passes through a pipe 19, the front chamber 16, the passage 8b in the valve body, the clearance between the valve seat 8a on the valve body and the seating face 11a on the poppet valve 11 and the passage 8c in the valve body 8 to the rear chamber 15. Therefore, the differential pressure between the two chambers 15 and 16 disappears whereupon the valve body 8, piston 2 and diaphragms 7 are urged to move toward the rear shell 18 to their initial positions under the action of a spring 17 which acts on the abutment portion of the cover 3.

Figure 2:
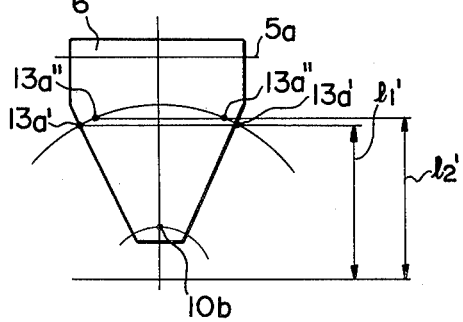
FIG. 2 is a diagrammatic plan view showing the relationship between the reaction lever and fulcrum plate in one conventional prior art vacuum degree augmentation device.

In the arrangement of the prior art vacuum degree augmentation device as mentioned hereinabove in which the portion of the reaction lever positioned in the center of the vacuum degree augmentation device or the distal end of the lever is normally biased forwardly or leftwards as seen in FIG. 1, since the reaction lever has the plain major surfaces as seen in FIG. 2, in the initial stage of the assembling operation of the device, the points of contact of the surface 6' of the reaction lever 6 with respect to the fulcrum plate 13 are positioned at the opposite side edges 13a' and 13a' of the reaction lever. However, as the side edges wear away as a result of use for a long period of time, the points of contact gradually move toward outward positions 13a'' and 13a'' whereby the effective radius of the fulcrum plate varies from the initial value $l'_1$ to the value $l'_2$ to gradually increase the augmentation ratio resulting in increase of hysteresis due to variation in abutment position on the forward and return strokes, respectively.

Figure 3:
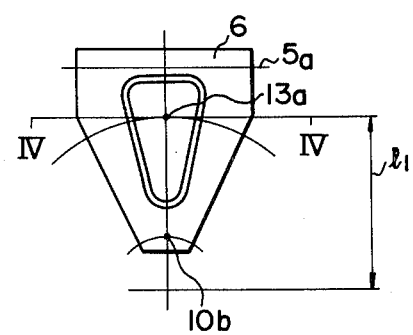
FIG. 3 is a diagrammatic plan view showing the relationship between the reaction lever and fulcrum plate in said vacuum degree augmentation device of FIG. 1 incorporating the invention.
Figure 4:
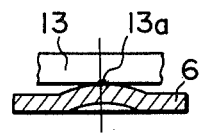
FIG. 4 is a cross-sectional view taken along substantially the line IV — IV of FIG. 3.
Figure 5:
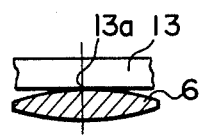
FIG. 5 is similar to FIG. 4, but shows another embodiment of the invention.

Referring now to FIGS. 3 through 5 in which one preferred embodiment of reaction lever of the invention is shown. According to the present invention, as is more clearly shown in FIGS. 3 and 4, it will be seen that the reaction lever 6 is curved outwardly in the center portion on one major surface of the lever. In the reaction lever, the point of contact of the lever with respect to the fulcrum plate 13 is positioned only at 13a in the curved center portion of the lever and even when the point of contact 13a has worn away, the value $l_1$ of the effective radius of the fulcrum plate remains substantially unchanged to provide a stable augmentation ratio at all times.

The same effect can be also obtained by the modified embodiment as shown in FIG. 5 wherein the reaction lever 6 is curved outwardly on the opposite major surfaces of the lever. And since the reaction lever 6 of FIG. 5 has a symmetrical configuration on the opposite major surfaces with respect to the horizontal axis thereof, the opposite major surfaces of the reaction lever can be selectively employed to thereby eliminate the possibility of such difficulty as inverse mounting.

In any of the two embodiments of the invention referred to hereinabove, since the fulcrum plate 13 having a curved surface component makes contact with the reaction lever at the portion having the smallest curvature of the plate, variation in the effective radius of the fulcrum plate can be minimized.

As will be apparent to those skilled in the art, by protruding the reaction lever on at least one major surface in the center portion of the lever 16 where the lever is subjected to bending stress from the plunger 10 and fulcrum plate 13, the resistance of the reaction lever to bending stress can be increased.

While only two embodiments of the invention have been shown and described in detail it will be understood that the same are for illustration purpose only and not to be taken as a definition of the invention, reference being made for that purpose to the appended claims.

What is claimed is:

1. A vacuum degree augmentation device of the type usable with push rod actuated vehicle brakes and having
   a hollow body,
   a plunger assembly shiftably mounted in said body and actuatable by said push rod for movement of said plunger assembly from a standby to an operated position thereof in response to actuation of said push rod,
   an output rod shiftably mounted in said body to be moved with augmented force in response to movement of said plunger assembly to its operated position,
   a shiftable diaphragm-piston mechanism mounted in said body between a pair of fluid chambers within the latter,
   means for subjecting one of said chambers to a fluid pressure different from atmospheric pressure,
   valve means operably associated with said plunger assembly for placing said chambers in communication with each other to maintain both of said chambers at substantially the same fluid pressure when said plunger assembly is in its standby position, and for isolating said chambers from fluid communication with each other and placing the other of said chambers in communication with the atmosphere for shifting said diaphragm-piston mechanism in response to the fluid pressure differential presented between said chambers when said plunger assembly is moved to its operated position,
   a generally cup-shaped fulcrum plate mounted on said output rod for transmitting a force to the latter for moving the same and having an arcuate portion generally concentric with the axis of said output rod and bonded with a narrow edge facing in a direction generally toward said plunger assembly and said diaphragm-piston mechanism, and
   a reaction lever extending generally radially with respect to the axis of said output rod, having a pair of oppositely facing side surfaces, and disposed with a radially inner portion of one of said surfaces engageable by said plunger assembly, a radially outer portion of said one surface engageable with said diaphragm-piston mechanism and a radially intermediate portion of the other of said surfaces engageable with said edge portion of said fulcrum plate,
   the improvement of which is characterized by and comprises:
      said intermediate portion of said other surface of said reaction lever is provided with a convexly curved surface contour having is longest dimension extending substantially radially for engaging said edge portion of said fulcrum plate in substantially one-point contact relationship,
   whereby the effects of normal working stresses and wear upon the interengaging portions of said reaction lever and said fulcrum plate leave the location of their point of contacting interengagement substantially fixed to prevent substantial changes in the augmentation ratio of the device as would otherwise result from said effects moving the location of the fulcrum for the reaction lever provided by its interengagement with said fulcrum plate.

2. The invention of claim 1, wherein:
   an intermediate portion of said one surface of said reaction lever disposed oppositely to said intermediate portion of said other surface of said reaction lever is also provided with a substantially radially extending, concavely curved surface contour configurationally adapted upon reversal of the facing orientation of said reaction lever for engaging said edge portion of said fulcrum plate in substantially one-point contact relationship, whereby said fulcrum plate may be employed in either of its alternative facing orientations without sacrifice of the advantage of its improved construction for said intermediate surfaces in preventing the effects of normal stresses and wear from substantially altering the augmentation ratio of the device.

* * * * *